June 21, 1966

M. FOEX 3,257,196

METHODS OF USING PLASMA TORCHES FOR TREATING
POWDERY REFRACTORY MATERIALS

Filed Nov. 27, 1962

INVENTOR
MARC FOEX

BY *Larson and Taylor*

ATTORNEYS

June 21, 1966 M. FOEX 3,257,196
METHODS OF USING PLASMA TORCHES FOR TREATING
POWDERY REFRACTORY MATERIALS
Filed Nov. 27, 1962 3 Sheets-Sheet 2

INVENTOR
MARC FOEX

BY *Larson and Taylor*

ATTORNEYS 3,257,196
METHODS OF USING PLASMA TORCHES FOR TREATING POWDERY REFRACTORY MATERIALS
Marc Foex, Paris, France, assignor to Centre National de la Recherche Scientifique, Paris, France, a society of France
Filed Nov. 27, 1962, Ser. No. 240,251
Claims priority, application France, Dec. 1, 1961, 880,744; Nov. 15, 1962, 915,434
3 Claims. (Cl. 75—10)

It is known to obtain very high temperatures by means of plasma torches. However, up to know, it was difficult to make use of such plasma torches for melting materials, in particular refractory materials or for producing reactions between materials, due to the fact that the materials to be treated and/or the products of treatment could not be maintained in the high velocity plasama jet and that the products were quickly thrown out from the high temperature zones.

The chief object of the invention is to obviate these drawbacks.

The main feature of this invention consists in placing the materials to be treated in a vessel having the form of a body of revolution having a rotation movement about its axis, and in providing, on said axis, at least one inlet opening for a plasama jet having a cross section smaller than said opening, the movement of rotation of said vessel about said axis making it possible to apply to its contents a centrifugal force which, while maintaining the materials treated in said vessel, keeps them in the intensive heating zone produced by the plasma jet.

In the general case where the material treated in said vessel is in powder form, this material is first compressed in the vessel before being subjected to the action of the plasma jet.

When it is desired to treat by means of a plasma jet a powdery material or materials compressed in said vessel, it is advantageous to provide in the compressed mass an axial cavity into which the plasma jet will penetrate. This will considerably reduce, especially at the beginning of the treatment by means of a high velocity plasma jet, the projections of material to the outside of the vessel due to the whirlwind movement created by the action of the plasma jet on the material. These projections, which are generally in the form of molten drops may be recovered in collecting means provided for this purpose.

The device according to the present invention further has the advantage of permitting, if necessary, a treatment exerted on the material in the vessel out of the presence of air, especially when the body of the plasma jet is located very close to the external surface of the vessel in the vicinity of the inlet opening thereof. If there is only one opening in said vessel, the gases injected thereinto are also discharged from the inside thereof through the same opening and through the space left between the plasma torch and the external wall of the vessel, thus preventing any inflow of the surrounding air into said vessel.

If the treatment of the material contained in the vessel by the plasma jet is pursued for a sufficiently long time, the jet of plasma may reach the opposite ends of the vessel. If this opposite wall is provided with an opening and if the shaft to the end of which the vessel is fixed is hollow, the gases may be evacuated from the inside of the vessel through said hollow shaft.

The gases may be evacuated immediately through the hollow shaft if, instead of providing a recess as above stated, I provide, in the compressed mass of material, a conduit opening into the hollow shaft.

Such devices therefore permit of keeping the solid, and even liquid, materials in contact with the plasma as long as it is desired. Such devices may be used with the different known types of plasma torch, whether including an electric arc or wherein the plasma is heated by high frequency induction.

In devices including plasma torches of the electric arc type it is possible to obtain in contact with the plasma flame temperatures ranging from 15,000° to 20,000° C.

Due to the fact that the plasma is introduced into a cavity formed in the rotating vessel, I obtain the further advantage that the losses of heat are reduced to a minimum. In the case, for instance, where it is desired to melt refractory materials which are bad conductors of heat, this melting takes place only in the vicinity of the plasma jet. The centrifugal force due to the rotation of the vessel produces a widening of the cavity formed therein in view of the fact that the density of the liquid is higher than the apparent density of the powder, even when compressed. This cavity is therefore limited first by a liquid layer adjacent to a layer of sintered material followed by powder which has not yet been sintered. When the plasma jet is stopped and if the centrifugating movement is continued the material initially molten then soldified during the subsequent cooling, has the form of a retort. Thus the losses by conduction are small due to the low conductivity of the refractory material at least below a given temperature. The radiation losses occur only through the plasma inlet opening (in the case of course where the opposite end of the vessel is closed) so that it is interesting to make this inlet opening for the plasma jet a little wider than the cross section of said jet.

In some cases the rotation may be slow enough so that the centrifugal force merely produces a stirring effect.

In the case of plasama torches where the plasma is formed by heating of a gaseous stream by high frequency induction, the temperature obtained inside the vessel is not so high as in the case of plasma torches working on the electric arc principle and this is first due to the nature of the torches themselves but also because it is necessary to provide an inlet opening greater than in the preceding case. However the temperature is still very high and the device according to the present invention making use of such a type of plasma torch will be used in many applications.

My invention also consists in causing the plasma jet to act as a chemical reagent on the material contained in the vessel or in using said plasma as a vehicle for a substance either gaseous or liquid or again in the powdery form, which is to be placed in contact with the contents of said vessel.

This last mentioned method according to the present invention may be brought into play in various manners. The possibility of producing and maintaining high temperatures on the inside of the rotating vessel is particularly useful for carrying out this method.

When the gas entering in the composition of the plasma also constitutes a reagent to be brought into contact with the material contained in the rotating vessel, this gas has a high reactivity due to its partial ionization. If the plasma consists of hydrogen it is probable that a portion of this hydrogen is thus placed, at high temperature, in the atomic state, which has for its effect further to increase its activity.

Preferred embodiments of my invention will be hereinafter described with reference to the appended drawings, given merely by way of example, and in which.

Figure 1:
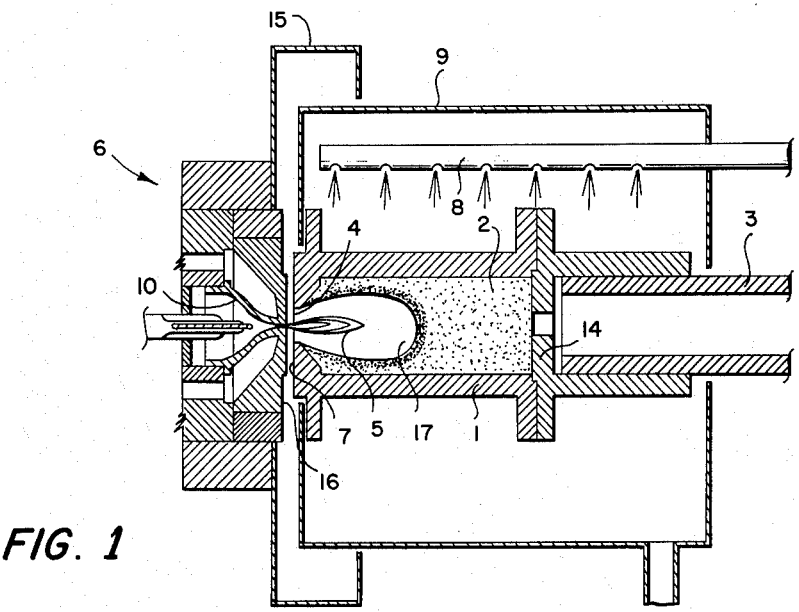
FIG. 1 is an axial section of a device according to the invention.
Figure 4:
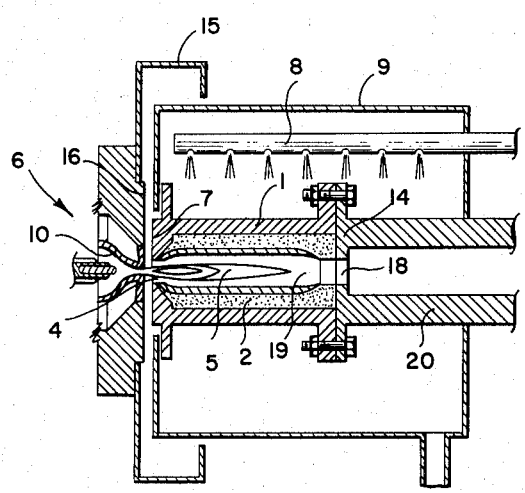

The device according to the invention comprises a vessel 1 in the form of a body of revolution wherein the material 2 to be treated is placed and which is adapted to be rotated about its axis through any suitable means. This rotation movement may be for instance imparted to vessel 1 by a shaft 3 to the end of which said vessel is fixed in such manner that the respective axes of revolution of shaft 3 and vessel 1 are in coincidence. Vessel 1 is provided at one end thereof, with an opening 4 for the introduction of a plasma jet 5. This plasma jet is obtained from a plasma torch 6 located opposite the external wall 7 of vessel 1. If this wall 7 of vessel 1 is located very close to the body of torch 6, most of the plasma jet will project into the inside of vessel 1. Cooling of said vessel 1 is obtained for instance by liquid jets 8, the whole being held inside an envelope 9 (FIGS. 1 and 4).

The plasma jet 6, in the case where it is of the kind including an electric arc (FIGS. 1 to 5) is advantageously made in such manner as to supply a plasma jet 5 having a section as small as possible. This is for instance obtained by making one of the electrodes in the form of a piece 10 shaped as a convergent nozzle.

Figure 2:
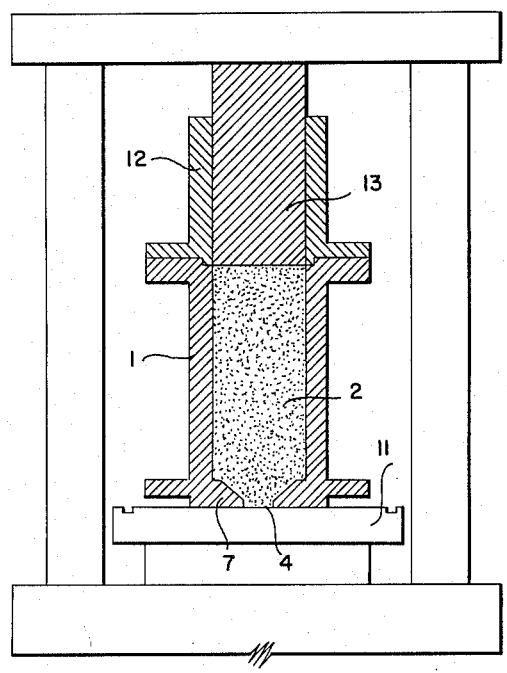
FIG. 2 is an axial sectional view of a portion of the device according to the present invention during the filling thereof.
Figure 3:
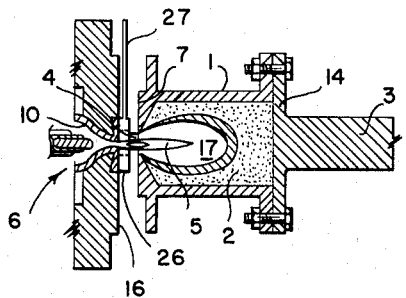
FIGS. 3, 4, 5 and 6 are respective axial sections similar to FIG. 1 of devices made according to the invention.
Figure 5:
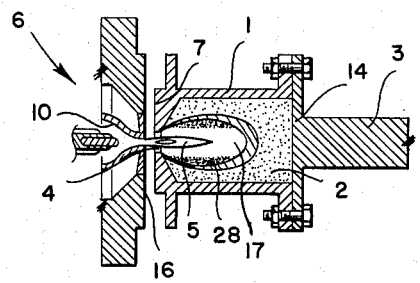

FIG. 2 shows an arrangement making it possible, previously to the action of a plasma jet, of packing a powder 2 to be treated inside vessel 1. The wall 7 of vessel 1 which is to be located next to the plasma torch is applied against the plate 11 of a hydraulic press. Vessel 1 is connected on the side of its open end with a coaxial guiding sleeve 12 having the same inner diameter as said vessel. A compression piston 13 is slidable in sleeve 12. Powder 2 is placed in vessel 1 through its open end and it is compressed by means of piston 13. Vessel 1 is then fitted with an end wall 14 which may consist either of an independent piece (FIG. 1) or of the end of shaft 3 (FIGS. 3 to 5).

The axial recess or cavity which is provided in powder 2 compressed in vessel 1 at its end 4 so as to prevent, or at least to reduce the projection of material from vessel 1 when the plasma torch begins to operate, is obtained for instance by a compression of the mass of powder by means of a metallic rod or by removing material along the axis by means of a drill.

The molten drops projected from vessel 1 may be recovered in a casing 15 (FIGS. 1 and 3) which surrounds the outlet wall 16 of the plasma torch 6. These projections have a tendency to cease during the treatment due to the widening, in mass 2, of the cavity or recess into which the plasma jet penetrate, this widening resulting simultaneously from the fact that the molten mass has a higher density than the powder, even compressed, and also from the fact that a centrifugal force is applied.

When treatment of the contents of vessel 1 must be performed out of contact with air, I preferably use a vessel 1 having no other opening than the opening 4 serving to the passage of the plasma jet (FIGS. 3 and 5) and the body of torch 6 has an end wall 16 parallel to the inlet face 7 of vessel 1, said walls 16 and 7 being very close to each other (for instance some millimeters). The plasma gases which enter vessel 1 through opening 4 are thus discharged from this vessel through the same opening 4 and they must escape through the narrow space between walls 7 and 16, thus preventing air from penetrating into vessel 1.

On the contrary, when it is desired to evacuate the gases through an aperture different from the inlet opening 4, I may use, for instance, the arrangement illustrated by FIG. 4 wherein an opening 18 is provided in the wall 14 of vessel 1, this opening 18 being located opposite inlet opening 4. In this case I provide, in a mass of material contained in vessel 1 previously to the action of the plasma jet, a passage 19 extending between openings 4 and 18 and leading into hollow shaft 20.

Figure 6:
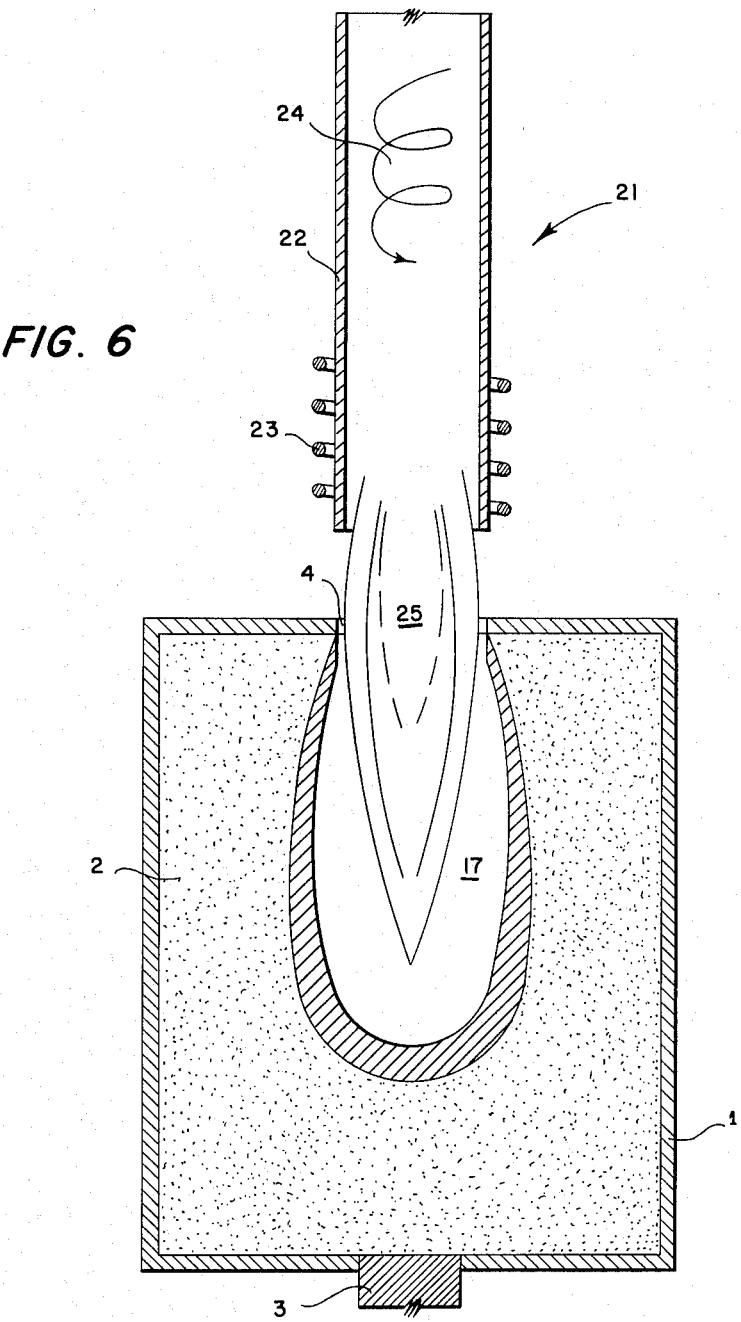

In the case of FIG. 6, I use, instead of an electric arc plasma torch, a torch 21 working by means of high frequency induction heating.

A gaseous stream 24 from which the plasma will be made is preferably given a whirling movement before penetrating the heating zone inside winding 23 where the plasma is formed.

This construction (FIG. 6) differs substantially from those above described only because the diameter of the inlet opening 4 must in this case be greater, due to the great cross section of the plasma jet 25.

In this embodiment of my invention, the heat that is obtained is less than in the preceding case but in some applications of the invention it will be preferable to make use of this type of plasma torch because the plasma that is formed is quite free from impurities, in particular from those due to the electrodes in the preceding embodiment.

The device according to my invention may be used for all materials which must be treated at high temperature, for instance to melt refractory materials.

The method according to the present invention is advantageously applied by means of devices such as above described, with possible modification thereof which will be hereinafter set forth, in particular concerning the means for introducing into the rotating vessel solid (powdery), liquid or gaseous substances adapted to react with the contents of said vessel.

I will hereinafter describe devices for directly injecting said substances into the plasma jet as it is leaving the plasma torch.

These substances may be also introduced in counter current to the plasma jet if use is made of the arrangement of FIG. 4, through a hollow shaft 20 and the opening 18 in vessel 1.

By way of non limitative example the methods according to the present invention may be applied with a device having the following characteristics.

Vessel 1 has:
  an internal diameter equal to 80 mm.
  an internal length of 100 mm.
  a diameter of opening 4 equal to 15 mm.

Vessel 1 is given a speed up to several thousands of revolutions per minute. Usual speeds of revolution range from 500 to 1,000 revolutions per minute.

The plasma torch arc has a power of 10 kw. that is to say 6 kw. in the plasma.

As reactions to be effected between the plasma itself and the matters contained in vessel 1, I will cite reductions of metallic oxides by a gaseous hydrogen plasma. In this manner I have produced tungsten from tungsten oxide.

I may also cause a hydrogen plasma to react upon a mixture of uranium oxide $U_3O_8$ and sulfur in the powder state.

Under the simultaneous action of hydrogen from the plasma and of the sulfur vapor disengaged inside the mixture under the effect of the temperature, the uranium oxide $U_3O_8$ is transformed into uranium sulfide of a composition ranging from $U_2S_3$ to $US_2$. The portion of the sulfides which is vaporized and which leaves vessel 1 must be condensed on cold walls.

I will obtain, according to the temperature of the plasma and the dimension of the recesses formed under the effect of heat and of the centrifugal force inside the mass contained in the vessel either the molten $US_2$ sulfide or a vaporized sulfide of a composition ranging between $U_2S_3$ and $US_2$ ($U_3S_4$ in many cases).

The cold wall elements above referred to may be located either between torch 6 and vessel 1 or in the hollow shaft 20 when use is made of the construction illustrated by FIG. 4.

With a plasma consisting of nitrogen it is possible to nitride some oxides.

Plasma is often used as a vehicle for introducing materials (in the powdery state, in the liquid state or in the gaseous state) into vessel 1. In this case there should be provided, at the outlet of plasma torch 6, a device 26 for injecting materials into the plasma jet, as illustrated by FIG. 3. This device may be a hollow annular body comprising a circular slot or holes directed toward the plasma jet, this body being fed with materials under pressure through the pipe 27.

Such an arrangement may be used for instance for preparing metallic vanadium by introducing, into a rotary vessel 1 containing a mixture of vanadium oxide $V_2O_3$ and of calcium chloride $Cl_2Ca$, vaporized calcium through the intermediate of an argon plasma (having for instance a feed rate of 1,000 liters/hour) in which said calcium had been introduced in the form of powder.

Vanadium is reduced to the metallic state whereas there is a formation of lime which gives with $Cl_2Ca$ a relatively fusible slug. The metal is separated from the slug by centrifugation.

In the absence of $Cl_2Ca$ the temperature of the molten mass inside the vessel will be higher due to the smaller fusibility of the slug. In this case a portion of the vanadium escapes from vessel 1 in the form of a vapor together with the calcium in excess, and it is recovered by condensation on cold walls, for instance on the outer walls of vessel 1 and torch 6.

It will be possible, in the same conditions, starting from oxides brought at very high temperature, to obtain a great number of reactions with reagents conveyed by a plasma such as an argon plasma. For instance, I will obtain from metallic oxides:

Borides by reaction with boron halides or with boron in the powder state, conveyed by the plasma;
Carbides by reaction with carbon tetrachloride, various hydrocarbons or carbon in the powder state;
Nitrides by reaction with ammonia or ammonium chloride or another halide;
Sulfides, selenides or tellurides by reaction with hydrogen sulfide, hydrogen selenide or hydrogen telluride or with carbon sulfide, selenide or telluride or sulfur, selenium or tellurium halides or again vapors of sulfur, selenium or tellurium;
Silicides by reaction with a silicon halide or with silicon in powder state.

I might also perform the reduction of oxides by metallic vapors such as vapors of magnesium, aluminum alkaline or alkali-earth metals.

Another modification of the process consists in making compact masses of a pure body, for instance boron. Pure boron heated in the plasma is deposited upon a boron wall prepared through another method, even if this last mentioned product is not so pure as the first one. The deposit that is obtained is very compact.

For this purpose the initial powder of boron is placed in a vessel having for instance the above indicated dimensions and subjected to the action of a hydrogen plasma torch. Boron thus melts easily in the form of a retort.

By placing the vessel at a slightly greater distance from the plasma torch, I limit the energy admitted thereinto and I produce solidification of the mass of boron which is maintained at a high temperature averaging 2,000° C.

I project a boron halide (trichloride, triboride or triodide) into the flame of the hydrogen plasma. In these conditions the boron formed by dissociation of the halide in the hydrogen plasma deposits partly upon the hot wall thus formed, whereas the remainder is driven along in the form of a vapor and deposits as a fine powder on the cold collecting surfaces.

The same operation may be performed with zirconium and even with refractory oxides.

The device according to the invention may also be used in other methods of applications.

Thus it is possible to produce the reaction of the components of a mixture, for instance a mixture of zirconium and boron, under the effect of the heat supplied by a plasma, for instance of argon, to obtain for instance zirconium boride $ZrB_2$ according to the reaction:

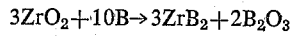

$$3ZrO_2 + 10B \rightarrow 3ZrB_2 + 2B_2O_3$$

If 800 gr. of a stoichiometric mixture of $ZrO_2$ and boron, previously compressed in a vessel under a pressure of 40 kgs./cm.$^2$ is treated by the action of an argon plasma at a rate of feed of 1,000 liters/hour and with a torch apparatus supplying the powder above indicated, the operation lasts half an hour and stops after one half of the mixture has reacted. A considerable disengagement of $B_2O_2$ is observed while $ZrB_2$ is formed.

I may also form in advance a recess in a refractory material by heating with a plasma and, after cooling with a centrifugal action and solidification of the layer 28 of liquid material (FIG. 5), use this recess at a temperature lower than the melting temperature of said material, to treat liquid matters 29.

I therefore obtain in this manner a new type of apparatus in which chemical reactions can take place at temperatures as high as 15,000° to 20,000° C.

What I claim is:

1. A method of treating a powdery refractory material comprising: filling a vessel, having an axis of symmetry and one opening along said axis, with said powdery material and pressing it therein, rotating said vessel about said axis to subject said powdery material to a centrifugal force confining said powdery material within said vessel, directing the stream of plasma produced by a plasma generator into said vessel through said opening for melting said powdery material, said vessel being rotated at a speed sufficient to compensate the sweeping force of the plasma stream upon both the powdery and molten material and to prevent the escaping of material through said opening under the blasting action of the plasma stream.

2. A method of treating a powdery refractory material comprising: filling a vessel, having an axis of symmetry and one opening along said axis, with said powdery material and pressing it therein, forming an axial blind hole in said pressed powdery material on part of the axial length of said vessel, rotating said vessel about said axis to subject said powdery material to a centrifugal force confining said powdery material within said vessel, directing a stream of plasma produced by a plasma generator into said vessel through said opening and into said axial blind hole thereby melting the powdery material adjacent said blind hole, said vessel being rotated at a speed sufficient for creating a centrifugal force sufficient to compensate the sweeping force of the plasma stream upon the powdery material to prevent the latter from escaping from said vessel through said opening under the blasting action of the plasma stream and to suspend the molten product within the hot zone created by said plasma stream against the walls of said blind hole.

3. A method according to claim 2 wherein said stream of plasma is caused to melt the powdery refractory material adjacent said blind hole on part only of the thickness of the layer of material defined in said vessel between said blind hole and the walls of said vessel whereby the non molten powder, adjacent the walls of said vessel, defines a lining protecting said walls.

References Cited by the Examiner

UNITED STATES PATENTS

| | | | |
|---|---|---|---|
| 1,728,941 | 9/1929 | Marden et al. | 75—84 |
| 2,142,943 | 1/1939 | Kerschbaum | 23—279 X |

FOREIGN PATENTS

| | | |
|---|---|---|
| 1,037,079 | 8/1958 | Germany. |
| 866,106 | 4/1961 | Great Britain. |

OTHER REFERENCES

"Mellor" Inorg. and Theo. Chem., vol 12, page 95. U.S. Pat. Off. Lib. QD31M4.

Tyler: (Journal of Metals) January 1961, pp. 51–54 Ph.

Hedger et al.: (Metal Powder Report) vol. 17 No. 12, August 1963.

Abstracts an article from "Powder Metallurgy" No. 8, 1961, pp. 65–72.

MORRIS O. WOLK, *Primary Examiner.*

JAMES H. TAYMAN, *Examiner.*